No. 895,221.

PATENTED AUG. 4, 1908.

V. A. WILLIAMS.
DISINFECTING APPARATUS.
APPLICATION FILED APR. 8, 1908.

Witnesses
Jos. F. Collins
R. Craig Greene

Inventor
Virgil A. Williams
By George H. Lamar
Attorney

UNITED STATES PATENT OFFICE.

VIRGIL ARMSTRONG WILLIAMS, OF SEDALIA, MISSOURI.

DISINFECTING APPARATUS.

No. 895,221.      Specification of Letters Patent.      Patented Aug. 4, 1908.

Application filed April 8, 1908. Serial No. 425,872.

*To all whom it may concern:*

Be it known that I, VIRGIL ARMSTRONG WILLIAMS, a citizen of the United States, residing at Sedalia, in the county of Pettis and State of Missouri, have invented certain new and useful Improvements in Disinfecting Apparatus, of which the following is a specification.

The invention relates especially to securing uniform delivery of disinfecting liquid although the level of the liquid in a supplying reservoir varies materially.

It also relates to providing for replenishing such reservoir by merely pouring in additional fluid, and automatically controlling the discharge therefrom into an open constant-level receptacle from which liquid escapes uniformly.

Figure 1:
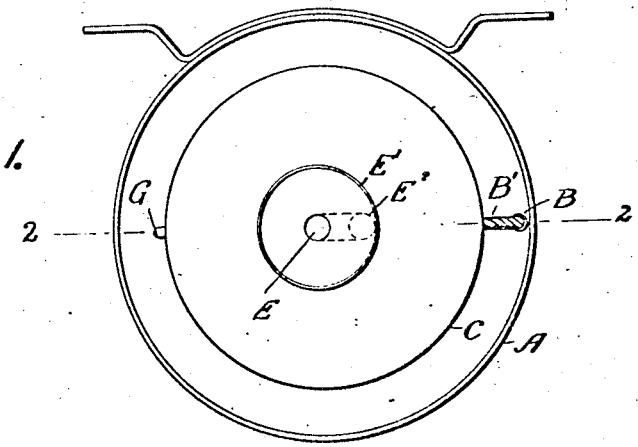
Figure 2:
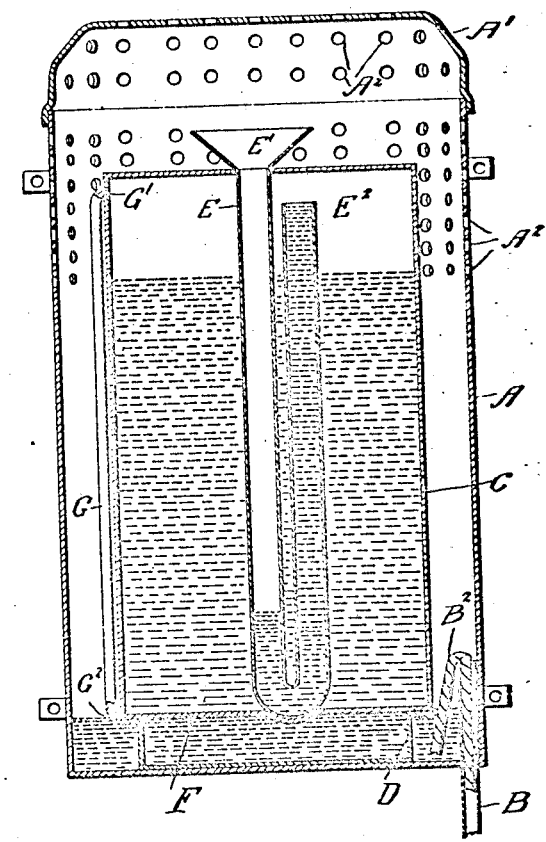

Figure 1 is a plan view of my device, the cover being removed. Fig. 2 is a section on the line 2—2 of Fig. 1.

A is an outer receptacle having a cover A' and an outlet tube B containing a wick $B^2$ which extends downward to the bottom of the receptacle A. The upper portion of the vessel A and its cover A' are preferably perforated as at $A^2$. Centrally located within A is an interior reservoir C closed except as hereafter specified. The reservoir C rests upon a bracket or cup D in the lower part of the vessel A. For admitting liquid to the reservoir C there is a U-shaped tube E, having one branch extending up through the top of the reservoir and terminating in a funnel E', and having its other open branch terminating in the upper part of the reservoir at $E^2$. In the bottom of the reservoir C is a relatively small aperture F for permitting the flow of liquid into the supporting receptacle A. Alongside the reservoir C a downwardly open tube G extends upward and opens into the upper part of the reservoir at G'.

The operation of my device is as follows, the parts being assembled as shown in the drawings:—Liquid poured into the funnel E' passes through the tube E and escapes at $E^2$ into the reservoir C, and as the opening F is relatively small, but a small portion of liquid will escape while the reservoir is being filled; air meanwhile escaping through G' and G. When the level of the liquid reaches G', the filling is continued until sufficient liquid has escaped through F and $G^2$ to bring the level in the outer receptacle to $G^2$, when the filling is stopped and the flow from $G^2$ ceases. However liquid will continue to escape from F until the level in E falls to such a point as to establish equilibrium. As liquid is withdrawn from the vessel A by the capillary action of wick B', or by other devices, the liquid seal at $G^2$ is broken, which automatically admits air above the liquid in C and allows liquid to flow out at F until $G^2$ is again sealed and equilibrium reëstablished.

My devices continue to operate until the liquid is exhausted, require no other attention than refilling the reservoir when emptied. They involve no hermetic closure or valve for filling the aperture, nor inversion of any part in filling or refilling; they are certain in operation, have no moving parts to get out of order, and are filled without the attendant putting his hands into the liquid or touching any parts in contact with the liquid.

I do not confine myself to the specific construction shown, as various obvious modifications may be made without changing the invention. If desired, the bottom of the reservoir may be removable, allowing inspection of the interior.

What I claim is:

1. In apparatus of the class described, the combination with a liquid receptacle, of a closed liquid reservoir communicating below with said receptacle and adapted to retain its contents by atmospheric pressure upon liquid in the latter, and a U-shaped tube extending approximately to the bottom of the reservoir having one branch terminating in an open end within and at some distance above the bottom of the reservoir and its other open branch terminating at a higher point without said reservoir; whereby the liquid in the reservoir may be replenished by pouring liquid into the upper end of said tube.

2. In apparatus of the class described, the combination with a liquid receptacle, of a closed liquid reservoir in said receptacle and provided with an aperture for the escape of liquid and with a conduit, for the admission of air, terminating below approximately at the normal level of liquid in said receptacle, means for permitting the gradual escape of liquid from said receptacle, and a U-shaped tube extending approximately to the bottom of the reservoir and having one open branch terminating within and near the top of the reservoir and its other open branch terminating at a higher point without the reservoir.

3. In apparatus of the class described, the combination with a receptacle, of a closed reservoir communicating below through a small aperture with said receptacle, an open conduit leading from a point in the receptacle approximately at the height of the bottom of the reservoir into the upper portion of the latter, and means for permitting the gradual removal of liquid from said receptacle; whereby the lower end of said passage is at intervals uncovered by the liquid in the receptacle permitting air to enter the reservoir and cause the escape of liquid therefrom, to again seal said conduit.

4. In apparatus of the class described, the combination with an outer receptacle adapted to contain liquid, of a closed reservoir supported within and above the bottom of said receptacle and provided with a small aperture at its bottom, an open tube leading from a point, in the receptacle, approximately in the plane of the bottom of the reservoir, into the upper portion of the latter, means for slowly removing liquid from the receptacle, and a tube having an open end in the upper part of the reservoir, extending downward approximately to the bottom of the same, bending again upward, and terminating in an open funnel above the plane of the end within the reservoir.

5. The combination with an outer perforated receptacle having a removable cover, of a closed inner reservoir above the bottom of the receptacle and provided with a small aperture at its bottom, an open tube leading from the lower part of the receptacle into the upper part of the reservoir, a U-shaped tube for filling the reservoir, and a wick for slowly removing liquid from the receptacle.

In testimony whereof I affix my signature in presence of two witnesses.

VIRGIL ARMSTRONG WILLIAMS.

Witnesses:
 LEE LOVINGER,
 F. L. HOXIE.